United States Patent [19]
Hemdal

[11] 3,969,701
[45] July 13, 1976

[54] FUNCTION BLOCK ORIENTED SPC SYSTEM

[75] Inventor: Göran Anders Henrik Hemdal, Skarholmen, Sweden

[73] Assignee: Telefonaktiebolaget L M Ericsson, Stockholm, Sweden

[22] Filed: Mar. 27, 1974

[21] Appl. No.: 455,294

[30] Foreign Application Priority Data
Apr. 9, 1973 Germany............................ 2317772
Apr. 9, 1973 Sweden............................ 7304982

[52] U.S. Cl. ............................ 340/172.5; 179/18 ES
[51] Int. Cl.²..................... G05B 15/00; H04M 3/00
[58] Field of Search............... 340/172.5; 179/18 ES

[56] References Cited
UNITED STATES PATENTS

| | | | |
|---|---|---|---|
| 3,560,936 | 2/1971 | Busch | 340/172.5 |
| 3,568,157 | 3/1971 | Downing | 340/172.5 |
| 3,569,939 | 3/1971 | Doblmaier et al. | 340/172.5 |
| 3,757,307 | 9/1973 | Cosserat et al. | 340/172.5 |
| 3,818,455 | 6/1974 | Brenski et al. | 340/172.5 |

*Primary Examiner*—Joseph F. Ruggiero
*Attorney, Agent, or Firm*—Hane, Baxley & Spiecens

[57] ABSTRACT

In a SPC (Stored Program Controlled) system including function blocks of the controlled system proper and function blocks of the controlling computer, an improved function block orientation is introduced by providing each function block with its own program and data stores and with its own addressing device. Via an address decoder, access to control information of the respective function block, registered in its stores is possible only by means of its addressing device identified by a responsive function block number. The central processor unit of the computer communicates with the addressing devices of the function blocks by means of a selection device which is set by the respective function block identifiers or numbers. In each addressing device are stored addressing parameters which define the storage structure of the control information in the associated stores. For performance of a control operation, operation parameters are supplied to the central processor unit. The actual function block number is one of the operation parameters which, however, are not bound to the storage structure. An address calculation unit associated with the central processor unit calculates on the basis of the operation and addressing parameters an address number allotted to the responsive control information. The address number is transferred via the selection device to the address decoder of the called function block.

9 Claims, 4 Drawing Figures

FUNCTION BLOCK ORIENTED SPC SYSTEM

BRIEF SUMMARY OF THE INVENTION

The invention relates to a SPC (Stored Program Controlled) system which, for execution of functions, contains devices controlled by a computer, for example, in a SPC exchange, the devices of which perform telecommunication functions.

In the organization of conventional exchanges, that is for the execution of telecommunication functions in exchanges without data processing, the principle is known of dividing up the exchange into individual function blocks so that functions are carried out in each block which are easily delimitable from functions in other blocks so that, in conjunction with interworking between the function blocks, there will be the simplest possible interfaces with as few signalling circuits as possible. Examples of function blocks are: subscriber supervisory block, block for selector stages, block for connection of the exchange to different signalling systems on trunk circuits, block for analysis of possible communication paths and for selection of one of the possible communication paths, block for charging purposes.

In principle there are only two types of function blocks. The first type comprises executive devices, that is devices which perform direct telecommunication functions, for example crossbar selectors, and controlling devices which control the executive devices, for example cause changes of voltage at the operating points of the crossbar selector. The second type of function blocks comprises solely controlling devices which chiefly control the interworking between the function blocks, for example a marker which performs the selection of a possible communication path belongs to the second type of function blocks.

If a computer system is added for control of such a system consisting of function blocks of the two types, an extension of the system is obtained through which, for example the principle is known through the publication "D-10 Electronic Switching System" in the journal "Japan Telecommunications Review — Vol. 13: No. 3 and 4, and Vol. 14: No. 1" of forming all controlling devices in the original conventional system as parts of the computer system. The computer system consists of at least one computer with a processor unit and with stores for programs and data, the functions of the system proper and the data of the state of the executive devices being stored, respectively, in the form of instruction columns in the program store and of data groups (so called variable groups) in the data store, and being addressed, processed and altered by means of the processor unit. The processor unit contains an arithmetic unit and a number of registers, for example information registers and address number registers, for brief storage of instructions and variables, and their addresses in the program and data stores, respectively, such addresses being obtained either as result of an address calculation by an arithmetic unit or being read as directly usable variable from the stores. It is not the purpose of this description to explain known modes of operation of a computer, but an explanatory paragraph may be devoted to the addressing methods used in known systems, as the basic idea of the proposed SPC system will thereby appear much more clearly.

As already noted, there are stored in the program store instruction columns each of which consists of a number of instructions. Each instruction is allotted a number as an address and the instructions in a column have consecutively increasing address numbers. For the processing of a column it is normal that the first instruction of a column is addressed, read and processed and that the last step in each instruction implies that the address number allotted to it is increased by one by means of a "+1" adder, whereby the addressing of the next instruction belonging to the column is initiated. In addition to this normal processing there are so-called jump instructions which, instead of the step implying raising of the address number by one unit, indicate an entirely new address number in the program store to which the computer jumps for processing the instruction stored under this jump address number, thereafter continuing to perform the instructions of the consecutive address numbers which follow.

As already noted, so-called variables which express addresses, constants or state data are stored in the data store. Whereas each instruction consists of a constant number of binary bits selected for the program store, the variables consist of different numbers of consecutive bits in the data store. In the data store are stored words, each of which consists of a constant number of binary bits selected for the data store, and one address number is associated with each word. There are variables which comprise parts of a word, a whole word or more than a word, and it is one of the tasks of the processor unit to process a specific variable. If, for example, it is a question of data of the state of identical devices, the devices are defined by means of consecutive index numbers and the variables of all devices are combined in the data store into a contiguous group of variables. In the data store, a variable of a specific device is accessible if the address number of the word containing the start of the first variable of the group, the constant number of bits of which each variable in the group consists, and the index number of the device are known. This known data technique for access of a variable will be explained by means of an example, in which it is assumed that each word in the data store contains 16 bits, that a group of variables consisting of 256 variables of 4 bits each has the start address number 3022, and that the variable of the device with index number 45 among the existing index numbers 0–255 is to be processed. The $4 \times 45 = 180$ bits used for the variables of the devices with index numbers 0 to 44 occupy 11 whole words and the first 4 bits of the 12th word in the group of variables ($180 = 11 \times 16 + 4$), and the variable sought consequently occupy the second quarter of the 12th word with address number 3033. The processor unit contains a translation device which carries out the calculation necessary for access of a variable, but it is not necessary to consider the mode of operation of the translation device for description of the proposed SPC system.

The address numbers, explained above, for the addressing of the instructions in the program store and of the words in the data store constitute, in the known SPC systems, parts of instructions and variables and one obtains an interwoven data processing in which the division into function blocks selected in the conventional system totally disappears. This interweaving of addresses implies no disadvantage for the SPC system once the data processing starts into operation in the proper manner, as the computers work without error and nothing is changed in the system proper, that is the number of executive devices is not changed and the first existing devices need never be replaced by means of technically better devices which are characterized by other data and other forms of variables. It is recognized by experts that such interweaving is not disadvantageous as long as no extraordinary treatment of the SPC system is necessary. Based on experience one knows at the time of initiating the operation whether the used data processing methods are provided for such extraordinary treatment or not. At the time of putting into operation the extraordinary treatment the costs arising in the known SPC systems constitute an altogether too large proportion of the total costs for the final system, and the extraordinary treatment costs during operation in connection with disturbances or extension of the system must be reduced as well if the SPC systems are to compete economically with conventional systems.

The object of the invention is to provide a SPC system which takes into account extraordinary treatment wherein the division into function blocks does not disappear even during data processing and in which the interweaving of addresses is avoided.

BRIEF DESCRIPTION OF THE DRAWINGS

The proposed SPC system will now be described with the reference to the drawing wherein:

According to FIG. 1, in the proposed SPC system the initially described division into said two types of function blocks is used. In function blocks FB1 and FB3 of the first type are indicated subscriber supervision circuits LAH and selector stage TLN as executive devices with their associated controlling devices LAS and TLS, respectively. Block FB2, on the other hand, is a function block of the second type and contains a communication path analyser PA. In FIG. 1 the function blocks FB1, FB2 and FB3 symbolize a conventional exchange. When a computer D, having a central processor unit CPU and at least the two function blocks FB4 and FB5 indicated in FIG. 1 are added to controlling devices LAS, PA and TLS, an SPC system is obtained. The function blocks FB4 and FB5 do not differ in principle from those in the actual exchange, since the initially described division into function blocks can be achieved also for data processing. Function block FB4, for example, symbolizes the second type of function block and comprises solely controlling devices JOB with the task of allotting degrees of priority to the functions and thereby determining the order of sequence for execution of the functions. Function block FB5 symbolizes the first type, which comprises also executive devices. In the computer such executive devices are, for example, input and output equipments IOQ, which are indicated in FIG. 1 by the symbol of a magnetic tape recorder with associated controlling device IOS. To understand the ease of extra-ordinary treatment of the proposed SPC system it is not necessary to become familiar with the mode of operation of the computer and the controlled system to a greater extent than has been explained above.

If it proves possible to retain initially the described division of the function blocks in the SPC system as well, ease of extraordinary treatment will be realized. This is achieved through the fact that each of the controlling devices for each function block, irrespective of whether it belongs to the system proper or to the computer, in principle has its own program stores PS and their own data stores DS with addressing inputs and read and write circuits. It depends on the type of computer whether the program and data stores for the function block are arranged separately from one another or combined. FIG. 1 shows the latter case, which entails identical numbers of bits in the instructions in the program store and in the words in the data store. In such a case the read and write circuits are connected via a common read and write circuit, respectively, to an information register IR in the processor unit. For the read and write operations of the processor unit in the program and data stores instructions and variables, respectively, are temporarily stored in the information register. Each function block comprises also an addressing device AD connected to the processor unit. It is impossible to activate the addressing inputs of a store otherwise than by means of such addressing devices, and address signals arriving at the store are decoded in the known manner in an address decoder ADEC.

The principle is known of arranging in function blocks of the first type separate so-called regional computers which themselves comprise regional processor units, regional program stores and regional data stores and which execute routine functions of subordinate kinds, for example scanning of test points in the executive devices or conversion of call signals. Such regional processor units, however, do not affect the interworking between the function blocks and communicate with the central processor unit CPU in exactly the same way as the aforesaid program stores and data stores PS and DS exclusively via the addressing devices AD. For the sake of simplicity no regional computers are shown in FIG. 1.

Figure 1:
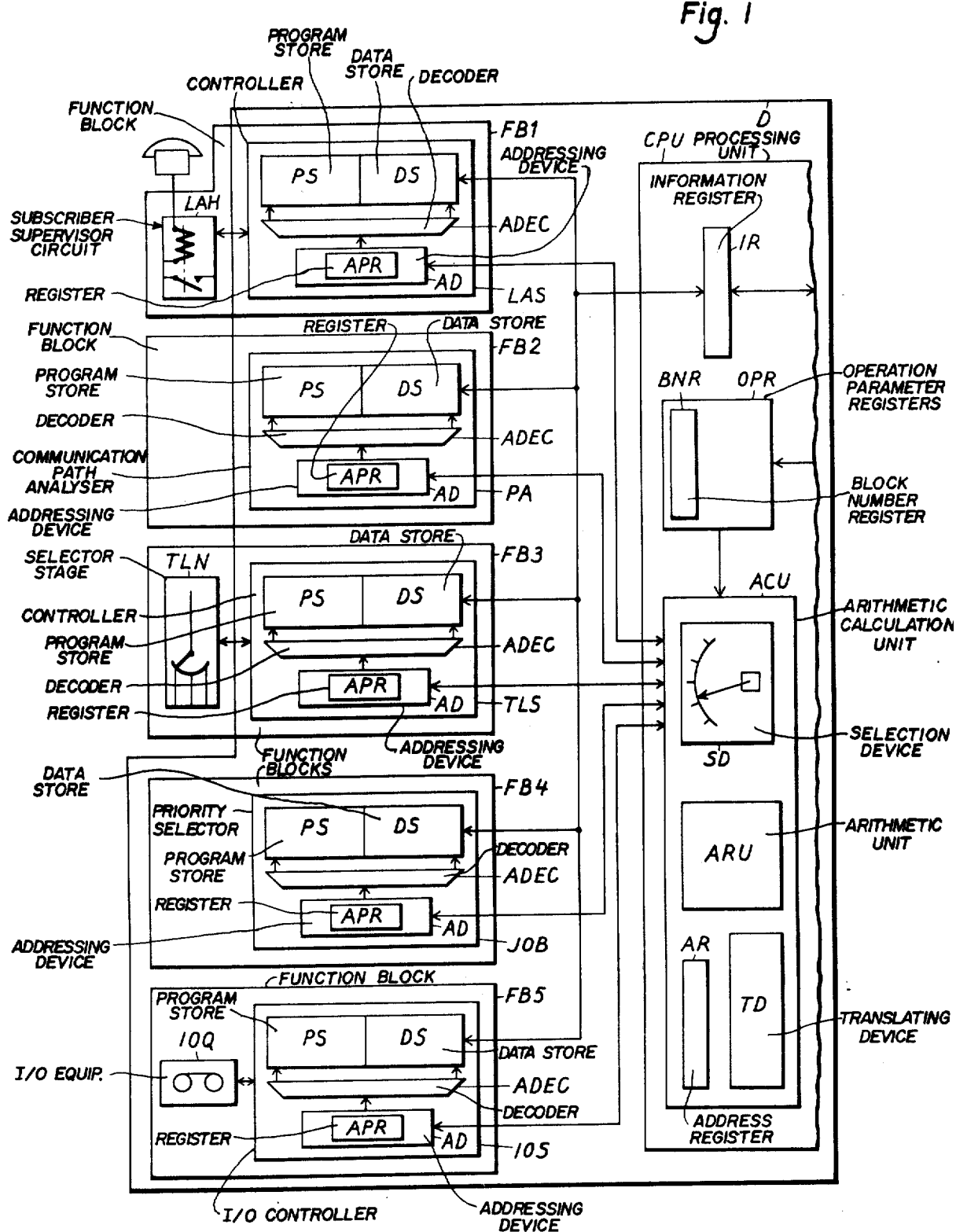
FIG. 1 is a block diagram of a system in accordance with the invention wherein the function blocks have separate stores.

The interwork between the processor unit and the addressing devices is indicated in FIG. 1 only in principle and will be described in detail further on. The basic idea is that each addressing device comprises an addressing parameter register APR in which are stored addressing parameters bound to the data structure in the associated function block stores and needed for calculation of the addresses for instructions and words. As the methods of address calculation are the same for all function blocks, there is arranged in the processor unit for all addressing devices an address calculation unit ACU which comprises a selection device SD, an arithmetic unit ARU, for example the initially named +1 adder, an address number register AR and the initially named translation device TD. The function blocks are allotted block numbers and the selection device is set by means of a block number register BNR. One of the function blocks is thereby called for a data processing operation. The block number register is one of a number of operation parameter registers OPR via which the processor unit transfers operation parameters to the address calculation unit. The operation parameters indicate in a terminology for the functions of the controlled system which of said functions is to be executed and is thus not tied to the data structure in the respective block store. Owing to the combination of the addressing and operation parameters in the address calculation unit the latter calculates the address number for an instruction or for a word in the called function block stores. The calculated address number, which applies only to the called function block, is registered during the actual operation in said address register and transferred via the selection device to the respective address decoder. The time-dependent process of the operation steps is controlled by the processor unit according to known computer methods and does not need further explanation in this context.

Figure 2:
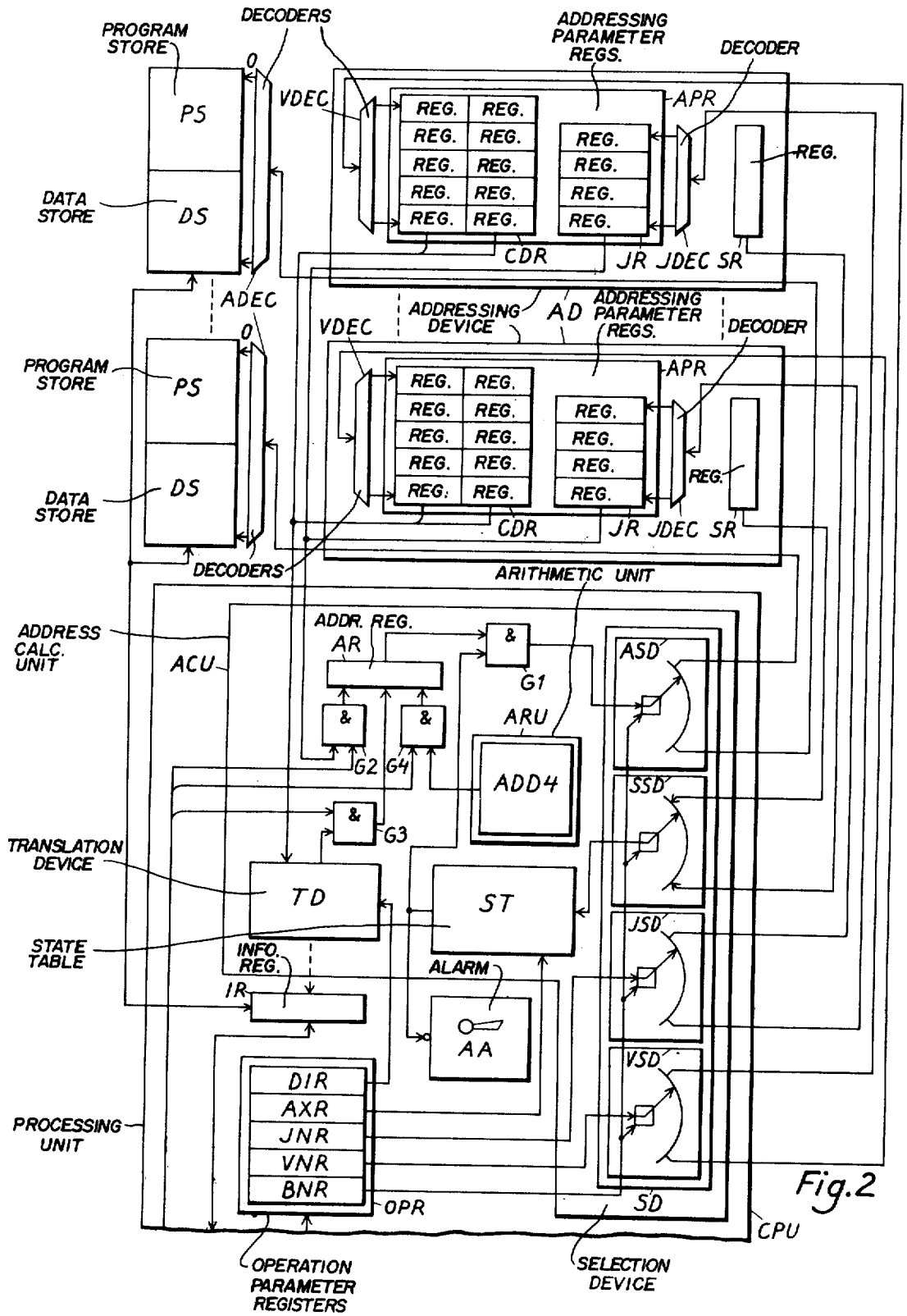
FIG. 2 is a block diagram of the system of FIG. 1 but in greater detail.
Figure 3:
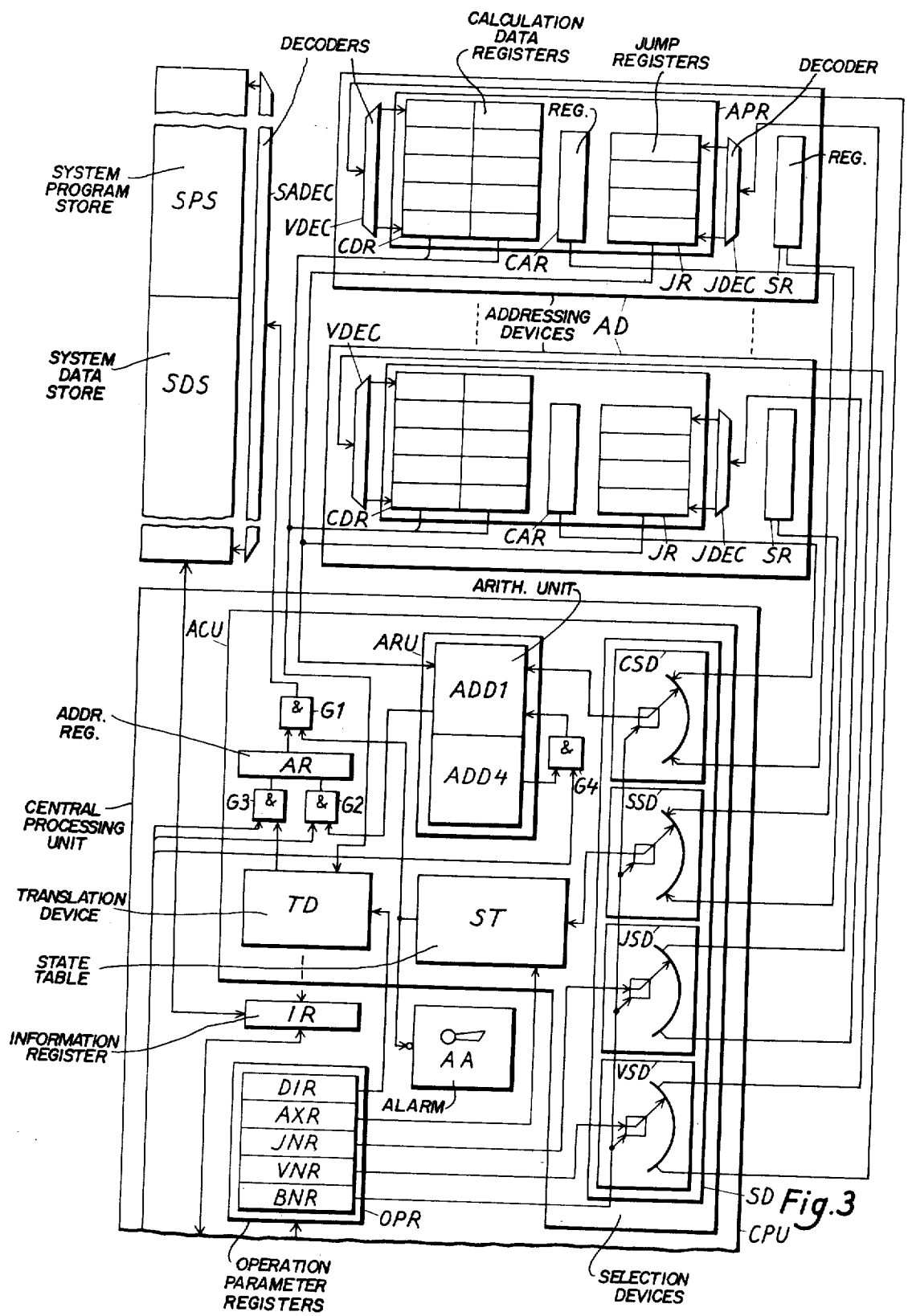
FIG. 3 is a block diagram of a system wherein the combined stores are combination.

By means of FIGS. 2 and 3 a detailed description is given of the addressing parameters registered in the addressing parameter registers APR and of the operation parameters transferred by the central processor unit CPU via the operation parameter registers OPR to the address calculation unit ACU. Two of the addressing devices AD are shown, each of which comprises a state code register SR, a number of jump registers JR and a number of calculation data registers CDR. The selection device SD comprises a number of selector planes which, as above, are set by means of a block number written into the block number register BNR.

The state of the respective function block is registered in binary coded form in the state code register SR, whereby for example it is defined that the block is in normal operating state, that the program store of the block is being charged with an instruction column, that the variables of the block are being updated, or that the block is being tested. A state selection device SSD connects the state code register of the called block to a state table ST in the calculation unit. The state table, by activating or deactivating a gate G1, determines whether, owing to the existing state of the block, on the one hand, and a control number, on the other, an address number may be transmitted or not to the address decoder ADEC of the called function block. The processor unit registers in an auxiliary register AXR of the operation registers OPR said control number, which for example consists of the block number of the calling block. If, for example, in FIG. 1 the subscriber supervision block FB1 is in normal operating state, it must not be accessible to the input block FB5. Since an attempt at such access must not occur in a faultlessly operating exchange, the state table in this case releases an alarm in an alarm apparatus AA. A more exact description of the state table is not required for understanding of the addressing processes in the proposed SPC system. The aforesaid address register AR is connected via the gate G1 to an address selection device ASD, the outlets of which are connected to the address decoders of the function blocks.

In the proposed SPC system a so-called global jump instruction contains the operation parameters which indicate to which function block the jump must be made and in which jump-in position within its instruction column the data processing is to start. The jump-in position, however, is not, as in the known systems, expressed by means of an address number but by means of a so-called jump number. The advantage of using the jump numbers is that, in connection wth the design or redesign of a function block, but regardless of the structure of the instruction column, a definition is provided that a jump-in shall be made at an operation determined by an associated jump number. Said jump-in operation is one of the functions performed by the block and remains unchanged even if, for example in conjunction with redesign, the operation receives a new serial number in the instruction column of the respective program store PS. The processor unit registers an ordered jump number as one of the aforesaid operation parameters in a jump number register JNR associated with the operation parameter registers, the outlet of the jump number register being connected to a jump number selection device JSD which, like all selectors in the selection device, is set to the called function block and which transfers the jump number to a jump number decoder JDEC in the addressing device of the called block. The jump number decoder is connected to the jump registers JR so that the jump register is read which belongs to the transferred jump number. In the jump registers are registered serial numbers, each of which defines in the associated instruction column the difference between the address number for the first instruction, the so-called column address number, and the address for a jump-in position defined by one of the jump numbers. In principle the read outlets of all jump registers in all addressing devices are connected to the arithmetic unit in the address calculation unit. If, however, as is assumed in FIG. 2, the column address number of each function block is 0, the jump registers are connected directly to address register AR, which moreover interworks with a +1 adder ADD4. Without describing the individual control steps of the processor unit it is apparent that, owing to a jump number, the address register receives and registers the address number which, after the transfer via the activated gate G1 and the address selection device to the address decoder of the called function block, addresses the instruction allotted to said jump number, and that for a normally continued execution of the instruction column the registered address number is repeatedly unit incremented.

To be sure, with so-called local jump instructions the normal execution of an instruction column is likewise broken, but a jump must be made to a new jump-in position within its own column. Although in principle it makes no difference whether the definition of a jump-in position is concerned with a local or a global jump instruction, the aforementioned advantage attained through the use of jump numbers nevertheless comes chiefly into its own in the global case. For the extraordinary treatability of the SPC system is unaffected by the local jump instructions and therefore no jump numbers need be allotted to the local jump-in positions. To avoid altogether too great a number of jump registers it is often in fact more advantageous, in accordance with the introductory description, to define the local jump-in positions by means of address numbers which the processor unit directly transfers to the address number register.

In the proposed SPC system an instruction for a read or write operation in one of the data stores DS contains not only the block number in question but also operation parameters which indicate the ordered kind of variable and, in a group of variables, the index number of the device to be processed. The kind of variable, however, is not, as in known systems and as explained in the introduction, determined by the address number for the word which contains the start of the group of variables but by a so-called variable number. The advantage of the use of variable numbers is that the read and write instructions remain unchanged even if the division into store fields for the existing variables and groups of variables of the called data store is changed. Such a change in the division is necessitated, for example, by additional devices in conjunction with an extension of the exchange, or by more modern devices the state variables of which relative to the variables of the hitherto used devices consist of a different number of bits. The processor unit registers an ordered variable number as one of the aforesaid operation parameters in a variable number register VNR associated with the operation registers. The outlet of the variable number register is connected to a variable number selection device VSD set to the called function block, the which variable number selection device transfers the variable number to a variable number decoder VDEC in the addressing device of the called block. The variable number decoder is connected to the aforesaid calculation data registers CDR, so that the calculation data register which belongs to the transferred variable number is read and which, according to the introductory description, has registered the address number for the data store word which contains the start of the group of variables defined by the respective variable number and the number of bits in each variable of the group. The contents of the accessed calculation data register and the contents of a device index number register DIR are transferred to the aforementioned translation device TD, which in the known manner supplies to the address register the address number for the word which is to be read or written and defines the bit position of the respective variable in the contents of the information register IR. There is no need to go into details of known computer technique, and in FIGS. 2 and 3 the determination of bit position is indicated solely through a dotted function line from the translation device TD to the information register IR.

It will already be apparent from the description that the division into function blocks is not cancelled because of the data processing, for in principle the processor unit has access only to the instructions and variables belonging to the function block of which the block number is registered in the block number register. Consequently, in the proposed SPC system each of the function blocks, for example in connection with their design, with replacement owing to an error, or with redesign, can be processed entirely on its own provided that the respective operating state is registered in the associated state register. The ease of extraordinary treatment of the proposed system will be explained on the basis of further examples at the end of the description.

Even if with present computer technique it is more economical to arrange a few large stores instead of many small stores, it is not necessary for that reason to abstain from the aforementioned advantages of a total function block orientation. It is assumed that all stores of the function blocks will consist of store fields in a system program store SPS and a system data store SDS and that such system stores are arranged in an integrated form shown in FIG. 3 so that the addressing inlets of the system stores are connected to a common address decoder SADEC and the read and write contacts of the system stores are connected via a common circuit to the information register IR in the central processor unit CPU. In this way the address selection device described in conjunction with FIG. 2 is superfluous. Thus, a single address signal line runs from the outlet of gate G1 to the inlet of the system address decoder.

The concentration of the instruction columns of the function blocks in the system program store makes it necessary that in a first embodiment each addressing device AD, of which two are shown in FIG. 3, comprises a column address register CAR associated with the addressing parameter registers for storing the column address number associated with the function block. The column address registers of the addressing devices are connected to a column selection device CSD, which, set to one of the block numbers, transmits the respective column address numbers to a first summand inlet of an adder circuit ADD1 in the arithmetic unit ARU. The sum outlet of adder circuit ADD1 is connected to the address number register AR. The repeatedly named +1 adder ADD4 and the read circuits of the jump registers JR are connected to the second and third summand inlets, respectively, of the adder circuit ADD1. Apart from the steps described in conjunction with FIG. 2 the column address number is added in this way, for example on execution of a jump instruction, to one of the serial numbers.

In another embodiment, not shown in FIG. 3, there are stored in the jump registers, instead of the serial numbers associated with the jump-in positions defined through the jump numbers, the corresponding address numbers of the system program store which are transferred directly to the address number register of the central processor unit. This second embodiment, accordingly, needs neither the column address register CAR, the column selection device CSD nor the adder circuit ADD1 and, therefore, viewed superficially appears to work more simply than the first embodiment shown in FIG. 3. An important advantage of the first embodiment, however, is that in conjunction with the rearrangement of the system program store, in which rearrangement the instruction columns whose instruction structure is not changed are transferred to new storage areas, only the column address numbers need be changed, whereas in the second embodiment all jump registers must be recharged.

As it is not necessary, but on the contrary would be a disadvantage for optimal utilization of the system data store, to store all groups of variables of a function block consecutively, i.e., one after the other, the concentration of all groups of variables in all function blocks in the system data store necessitates merely that in the calculation data register CDR of the addressing devices the corresponding address numbers of the system data store SDS are registered for the start addresses of the groups of variables. This leads to a form of data addressing which is comparable with said second embodiment for the instruction addressing.

With respect to both the data addressing and the instruction addressing, the placing of the instruction columns and groups of variables in the system stores has not in any way altered the principle of the proposed system, but with each of the function blocks are associated stores which are accessible only by means of the assigned addressing device.

Figure 4:
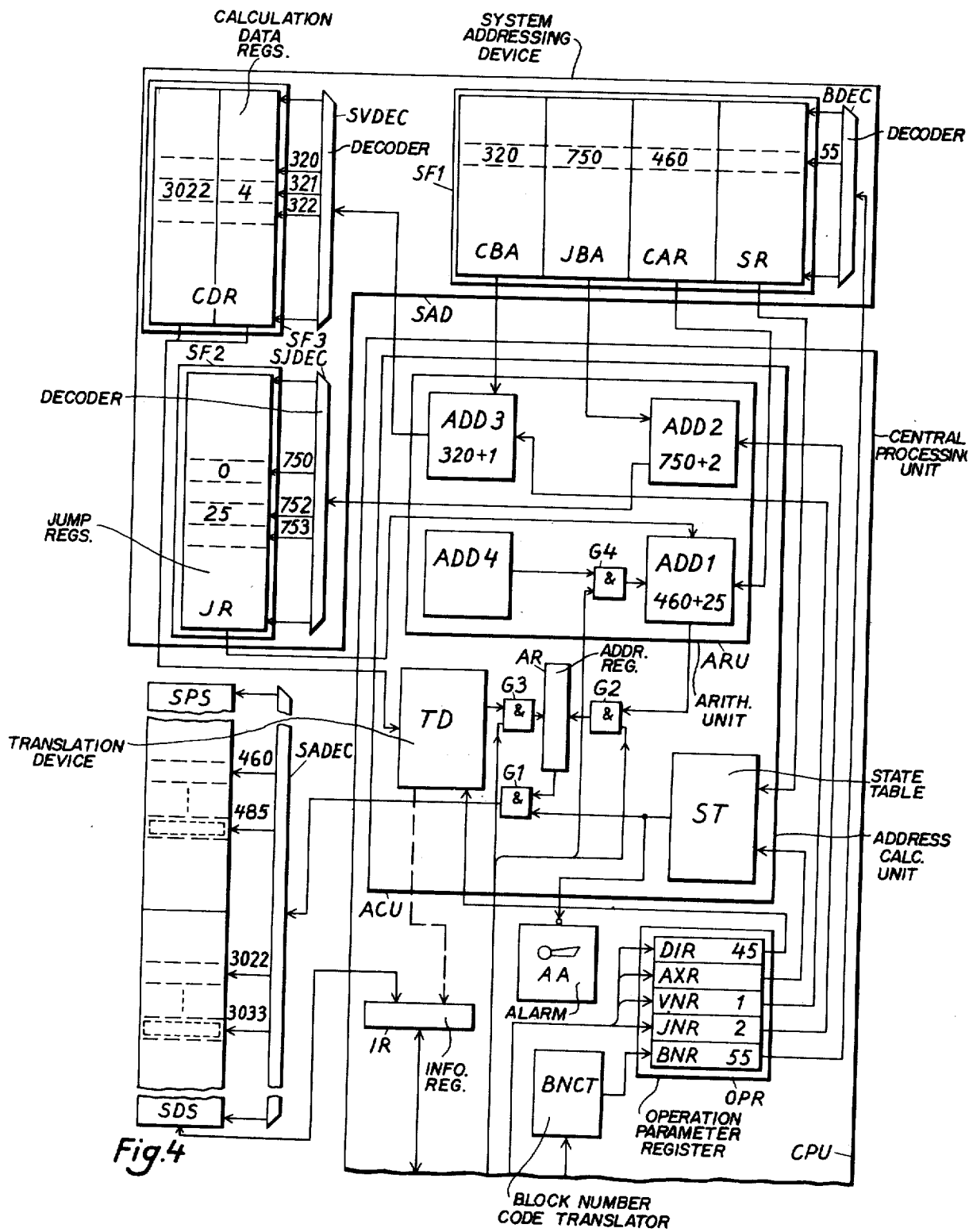
FIG. 4 is a block diagram of a system wherein the stores are combined.

FIG. 4 shows a concentration of all addressing devices of the function blocks, the aforesaid registers of the addressing devices being included in three storage fields of a system addressing device SAD. The first storage field SF1, which is addressed by means of a block number decoder BDEC, stores for each function block an addressing word which is composed of base address numbers JBA and CBA, explained below, for the second and third storage fields, of said state code and of said column address numbers. The second storage field SF2, which is addressed by means of a system jump number decoder SJDEC, comprises the aforesaid jump registers JR in all addressing devices, the jump registers associated with one function block forming a group with consecutive address numbers, one address number for each jump number, and the address number associated with the first jump number in a group forming one of the base address numbers of the second storage field. The jump base address number JBA is associated with the addressing word of the respective function block in the first storage field. The third storage field SF3, which is addressed by means of a system variable number decoder SVDEC, comprises the aforesaid calculation data registers CDR for all addressing devices, the calculation data registers associated with one function block forming a group with consecutive address numbers, one address number for each variable number, and the address number associated with the first variable number in the group forming one of the base address numbers for the third storage field, which calculation data base address number CBA being associated with the addressing word of the respective function block in the first storage field.

In the address calculation unit ACU of a SPC system equipped with the system addressing device SAD, the aforesaid selection device is superfluous since the block number register BNR directly feeds the block number decoder BDEC for the first storage field and since the state code and column address number, which are included in the thereby accessed addressing word, are transferred directly to the state table ST and to the adder circuit ADD1, respectively. The jump base address number and calculation data base address number in the accessed addressing word are transferred to, respectively, adder circuits ADD2 and ADD3 in the arithmethic unit ARU. The second summand inlets of the adder circuits ADD2 and ADD3 are connected to the jump number register JNR and variable number register VNR, respectively, and their sum outlets are connected to the system jump number decoder SJDEC and system variable number decoder SVDEC, respectively.

In order better to explain the addressing steps, examples of decimal numbers are introduced in FIG. 4 and it is assumed that a jump is to be made to the function block with block number 55 at the jump-in position with jump number 2. On the basis of this jump instruction the central processor unit registers in the block number register the number 55 and in the jump number register the number 2. The block number decoder activates the addressing inlet No. 55 of the first field SF1 in the system addressing device SAD and the associated addressing word is read. It is assumed that said addressing word contains 320 for the calculation data base address number, 750 for the jump base address number and 460 for the column address number and that the state code activates gate G1. In the adder circuit ADD2 the sum $750 + 2 = 752$ is formed from jump base address number and jump number. This sum is transferred to the system jump number decoder SJDEC, whereby in the second storage field SF2 access is obtained to the jump register with address number 752. It is assumed that the jump register group for the function block with block number 55 consists of four jump registers with address numbers 750 to 753. In conjunction with FIG. 2 it was stated that serial numbers are stored in the jump registers, the serial number 0 defining the start of the instruction column with an allotted jump number 0. This means that under each jump base address number, for example under address number 750 for block number 55, the number 0 is registered as serial number. It is also assumed that in the jump register with address number 752, the number 25 is registered as serial number, which the adder circuit ADD1 adds to the column address number 460. This results in the fact that the instruction column of the function block with block number 55 in the system program store starts under address number 460 and that the jump-in position with jump number 2 has the address number $460 + 25 = 485$.

It is also assumed that said instruction with address number 485 contains the order successively to read in its own function block with block number 55 the variables of the group of variables with variable number 1 and that the device with index number 45 is the next in succession. The central processor unit registers variable number 1 in the variable number register VNR and index number 45 in a device index register DIR connected to the translation device TD. The adder circuit ADD3 forms from the calculation data base address number and the variable number the sum $320 + 1 = 321$, which is transferred to the system variable number decoder, whereby in the third storage field SF3 access is obtained to the calculation data register with address number 321. It is assumed that the calculation data register group for the function block with block number 55 consists of three registers with associated address numbers 320 to 322, the variable number 0 also being used to define one of the three existing groups of variables. It is assumed, finally, that in the accessed calculation data register CDR with address number 321 there is stored as start address for the ordered group of variables the number 3022 in the system data store and the number 4 as a constant which indicates the number of bits per variable. The aforementioned translation device TD in the address calculation unit ACU evaluates the transferred calculation data and the device index numbers and calculates that, as explained above, the second quarter of the word with address number 3033 is to be read from the system data store.

Although the proposed addressing steps have been described on the basis that the three storage fields of the system addressing device and the three adder circuits work independently of one another, one skilled in the art will have no difficulty whatsoever in adapting said steps to the mode of operation of the processor unit system used. If, for example, additional registers and gates are used, one can manage with only one adder circuit or combine the three decoders of the system addressing device SAD into a single decoder. It is also one of the tasks of the processor unit to separate the accesses to the program store in time from the accesses in the data store and also to control, for example, the work of the +1 adder ADD4. The present description need not be concerned with the, in itself, known computer technique, which in FIGS. 2 – 4 is merely indicated by means of three gates G2, G3 and G4 for controlling the inlets of the address number register AR and the work of the +1 adder ADD4.

In FIGS. 2 – 4 the registers of the addressing devices and the storage fields of the system addressing device are connected solely through read lines to the processor unit and the processes for the addressing of instructions and variables of a function block are described on the assumption that the base addresses, the serial numbers, calculation data etc. are already registered in registers and storage fields assigned for that purpose. At least at the putting into operation of the SPC system, but also in conjunction with extensions, improvements and elimination of faults, the addressing devices must be charged. It is therefore advantageous to arrange the system addressing device into a function block of the second type, this addressing function block being allotted a corresponding addressing instruction column in the system program store and the storage fields of the system addressing device forming groups of variables of the system addressing function block. The instruction column of the addressing block also determines for example, apart from the described addressing steps, the manner in which, by means of charging devices and on the basis of an examination of unutilized areas in the stores of the computer, the variables of the system addressing device are obtained and written in.

To show the ease of extraordinary treatment of the proposed SPC system by means of an example, it is assumed that in one of the function blocks there is to be introduced an improved instruction column. Such a measure in the known interwoven systems would necessitate a reorganization of the stores, that is in principle recharging and retesting of all instruction columns, and in conjunction therewith a total stoppage of the system. In the proposed system the new instruction column is inserted in a standby function block with a standby block number. Charging or updating and testing of the standby block take place in time intervals which, according to the known rules for different degrees of priority, are intended for special functions so as thereby not to disturb the normal work which continues with the original function block as long as the standby block is prepared to take over. Likewise, without disturbing the normal work, the exchange of blocks takes place, which consists in allotting to the original block a waiting state and to the standby block the normal state of operation, and that a block number code translator BNCT to which, as indicated in FIG. 4, the block number register BNR is connected, converts the block number of the original block into that of the standby block. If the new block in normal operation is not yet working correctly, it is merely necessary to return to the old block. When after a test period it has proved that the old block is no longer required, its original addressing word is replaced by the addressing word of the standby block. Thereby the standby block is automatically allotted the original block number, so that said block number code translator is released and the standby block number is again available for the next extra-ordinary treatment. A total stoppage with completely new charging of the stores or another interruption of operation does not arise in the extra-ordinary treatment of the proposed system.

It will be readily realized that the above described interference-free changeover process from an old to a new function block has a special significance for a SPC exchange which, on grounds of reliability, uses two computers working in parallel in a known manner. In known systems such reorganization of the stores of one computer renders impossible parallel interworking with the still unreorganized second computer, since each operational step of one computer must be compared with the step of the other computer. Only when both computers have been reorganized, which involves restart of the system and break-down of all existing connections at that moment, the desired reliability in parallel operation is again ensured.

If two computers according to the present proposal work in parallel and a fault arises, fault tracing is facilitated for the very reason that, precisely at the time of an alarm, the called function block is always registered in the block number register. When it has been found in a known manner in which computer the said block is faulty, the faultfree block is connected to both computers. This means that the reliability is immediately restored to an extent of almost one hundred percent. Thereafter the faulty block is exchanged as described above, and finally the complete interworking is resumed. A restart of teletraffic does not occur at all in conjunction with removal of a fault.

If an improved instruction column is to be introduced in the proposed SPC system with two computers working in parallel, the columns in both computers are exchanged as described above, using standby block numbers, the steps in the changeover being carried out entirely in parallel in the two computers. No interruption of operation is caused because of to this alteration and the reliability does not diminish during such an extra-ordinary treatment.

We claim:

1. In a stored program controlled system wherein devices for the execution of various device functions and computer functions are controlled by a computer having stores for the storage of system control information and having a central processor for the performance of the system control and for the writing and reading, via an information register, of the memory means, said system comprising:
    a plurality of function blocks of a first type for performing functions which are delimited from the functions of other blocks, each of said blocks of a first type including both executive devices for performing operating functions and control devices controlling the executive devices;
    a plurality of function blocks of a second type, each of said function blocks of a second type including control devices for performing control functions and no executive devices;
    each of said function blocks being assigned an associated function block number;
    the controlling devices of both types of function blocks being included in the computer, and each of said controlling devices comprising a program store and a data store having read/write terminals for the storage of the control information of its associated function block and addressing means for addressing only the stores of its associated function block;
    connecting means for connecting the central processor to the control devices of a number of said function blocks; and
    said central processor unit comprising a block number register for the registering of the respective function block numbers, a selection device which is connected to the block number register in order to be set by means of the registered block number, said connection means connecting the addressing means selected by the selection device to the central processor and connecting the write/read terminals of the stores in the control devices to the information register in the central processor for enabling the latter to control, with the aid of the addressing means, the writing and reading in the program stores and in the data stores.

2. The stored program controlled system of claim 1 wherein each addressing means comprises a state code register in which the state of operation of the associated function block is stored in coded form, wherein the selection device comprises a state selection device, and wherein the central processor further comprises state supervision devices for supervision of the writing and reading in the stores of the respective function block in dependence on the state code, the state code being transferred with the aid of the connection means via the state selection device to the state supervision devices.

3. The stored program controlled system of claim 1 wherein each addressing means comprises addressing parameter registers for storing of addressing parameters which define the storage structure of the control information in the stores of the associated function block wherein the selection device comprises an address selection device, and wherein the central processor further comprises an address calculation unit which is common to all addressing means and with which the selection device and an address number register for registering of a calculated address number are associated, and operation parameter registers with which the block number register is associated and in which, for performance of a control operation, are stored such parameters which are not bound to said storage structure, the operation parameter registers being connected to the address calculation unit, the connection means connecting the addressing parameter registers to the address calculation unit and connecting the address number register to the addressing means of the associated stores via the address selection device set to the respective function block, said address number being calculated in the address calculation unit on the basis of the addressing and operation parameters.

4. The stored program control of claim 3, wherein said addressing means include addressing parameter registers having a number of calculation data registers and a variable number decoder connected to the calculation data registers which are defined by their associated variable numbers and registering calculation data which contain a numerical constant indicating the number of consecutive bits in the data store are associated with each of a number of variables defined by said variable number, said variables being parts of the control information for the respective function block and in consecutive order form a group of variables whose start is included in a data store word with an address number also associated with said calculation data, and wherein the address calculation unit comprises a translation device for translating the calculation data to the address number under which a variable in said group of variables ordered by the central processor unit is accessible in the data store, wherein the operation parameter registers comprise a variable number register for registration of variable numbers, and wherein the selection device comprises a variable number selection device, the connection means connecting the variable number register via the variable number selection device to the variable number decoders.

5. The stored program controlled system of claim 3, wherein the addressing parameter registers in each of the addressing means comprise a column address register in which a column address number is registered, a number of jump registers in which serial numbers are registered, and a jump decoder connected to the jump registers in which seral numbers are registered by means of the column address number the start of an instruction column being accessed which is accessible by means of consecutive address numbers for the program store and is a part of the control information for the respective function block, each of the serial numbers indicating the difference between the column address number and the address number for an instruction in said column, said instruction being defined by one of a number of jump numbers, and wherein the operation parameter registers comprise a jump number register for registration of said jump numbers, wherein the address calculation unit comprises an adding unit the sum output of which is connected to the address number register, and wherein the selection device comprises a jump number selection device and a column selection device, the connection means connecting the jump number register via the jump number selection device to the jump number decoders, connecting the column address registers via the column selection device to the first inlet of the adding unit, and connecting the jump registers of all addressing means to the second inlet of the adding unit.

6. The stored program controlled system of claim 3 further comprising a system program store and a system data store, wherein said program and data stores comprise storage fields in the system program store and the system data store, respectively, said system stores being provided with at least one system address decoder connected to the address number register, the control information of each function block including an instruction column being stored in an associated storage field in the system program store and including groups of variables each of which being stored in an associated storage field in the system data store.

7. The stored program controlled system of claim 3 further comprising a system addressing device wherein the addressing parameter registers for all addressing means are storage fields in the system addressing device, and wherein the selection device comprises a block number decoder having inputs connected to the block number register, the connection means, for enabling the access and transport of the addressing parameters in the respective function block, including means for connecting the outlets of the block number decoder to the system address device and for connecting the read terminals of the storage fields in the system address device to the address calculation unit.

8. The stored program controlled system of claim 7 further comprising a system program store and a system data store, wherein said program and data stores are storage fields in a system program store and a system data store, said system stores being provided with at least one system address decoder connected to the address number register, the control information of such function block including an instruction column being stored in an associated storage field in the system program store and inluding groups of variables each of which being stored in an associated storage field in the system data store.

9. The stored program controlled system of claim 8, wherein the system addressing device is so formed that its storage fields are arranged as storage fields of the system data store, the addressing parameters in the respective function block being accessed through the system address decoder and being read to the information register.

* * * * *